Dec. 18, 1962 L. J. ROGERS 3,068,685
CHROMATOGRAPHIC PROGRAMMER
Filed March 11, 1958
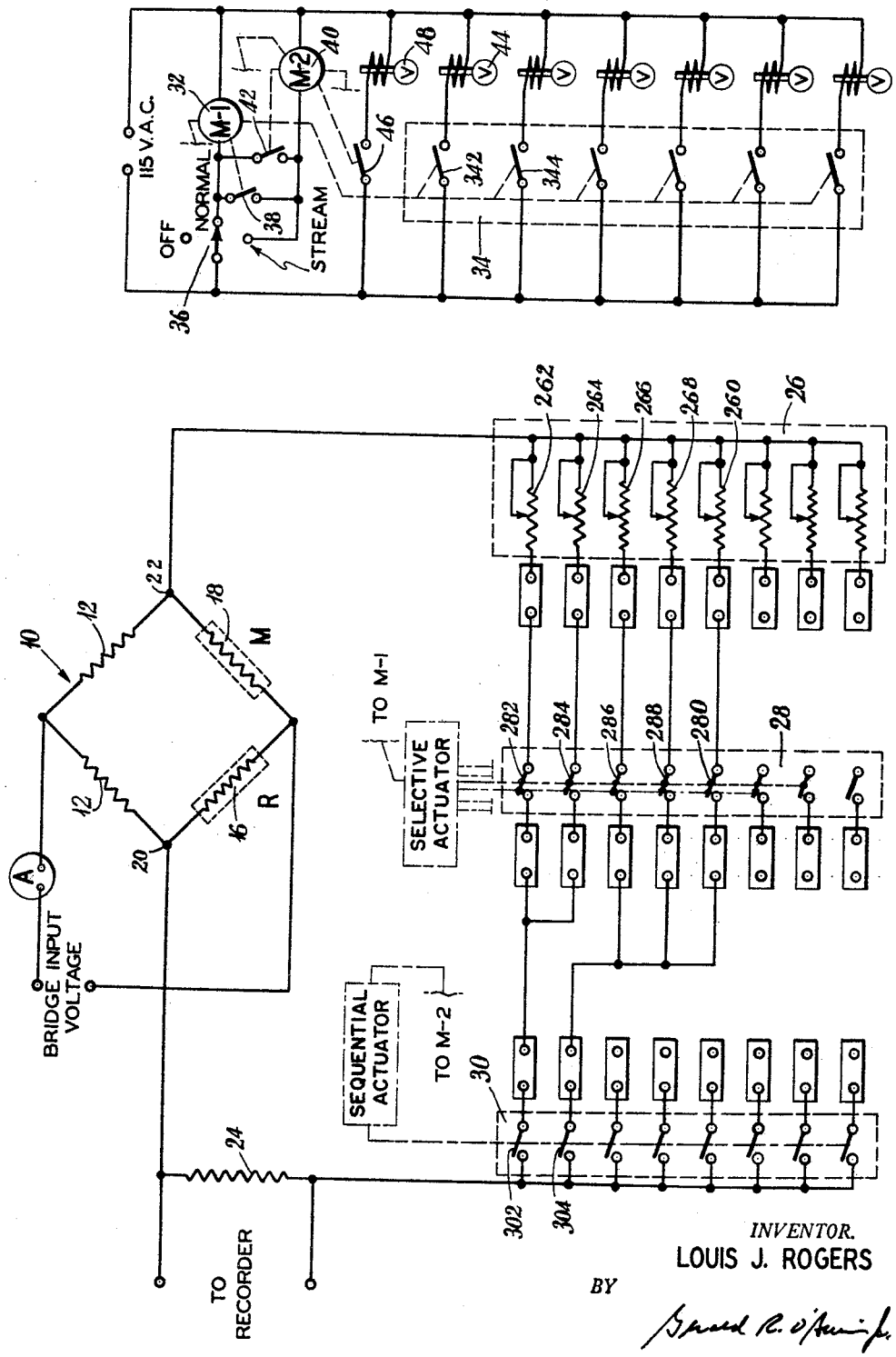
INVENTOR.
LOUIS J. ROGERS
BY
ATTORNEY

3,068,685
CHROMATOGRAPHIC PROGRAMMER
Louis J. Rogers, Nitro, W. Va., assignor to Union Carbide Corporation, a corporation of New York
Filed Mar. 11, 1958, Ser. No. 720,607
1 Claim. (Cl. 73—23)

This invention relates to a novel and versatile programming system for chromatographic analyzers.

The analysis of process fluids by the use of chromatographic analyzers is one of the fastest growing and most successful analytical procedures used in the chemical industry. The ability of the chromatographic analyzer to give accurate analyses of fluid stream components has been well proved and widely accepted. Until fairly recently, however, the chromatographic analyzer was in large measure relegated to the central laboratory where it was employed primarily for spot sample analysis. In order for the full potential of this instrument to be realized, it was necessary that it be brought out of the laboratory and utilized in the plant. Many of the problems involved in using the chromatographic analyzer as an automatic, repetitive, process instrument have been solved but many others remain.

One of the substantial problems encountered in the use of chromatographic analyzers as automatic process instruments has been that of sensitivity of measurement. Any one fluid stream, for example, may contain several components which it is desired to measure in the same reference cell and record with the same recorder. Since each component may vary in quantity or other measurable parameter, such as heat conduction, it is obvious that sensitivity of the measuring instrument will vary widely. If, for example, the measuring circuit is adjusted to give maximum accuracy in the measurement of component A which is known to be present in an amount approximating 80 percent of the total sample, then the sensitivity of the same circuit to the presence of component B in the amount of only 5 percent is apt to be very poor. To further complicate the situation, it may be desired to measure each of the components of a number of process streams with the same measuring circuit.

It is, therefore, the primary object of the present invention to provide means whereby a measuring circuit may be automatically adjusted to indicate each of a number of parameters with equal sensitivity.

Other objects, features, and advantages of the present invention are to provide such means especially adapted to chromatographic analyzers, to provide such means capable of measuring multiple components of multiple sample streams, to provide a system for programming multiple sample streams and directing them to an analyzer, to achieve the above objects with simple electrical circuitry.

The above objects are achieved by providing an electric measuring circuit capable of developing an output voltage proportional to the difference between the thermal characteristics of two fluids and in series therewith a plurality of electrical resistors, a plurality of range selector switches, a plurality of stream selector switches, and means responsive to the output voltage.

The invention may be best explained by reference to the embodiment of the drawing. A Wheatstone bridge measuring circuit 10 is shown connected to a direct current power supply which, in one embodiment, was approximately 5.0 volts. The "ratio arms" of the bridge contain fixed resistances 12, a third arm contains the reference cell resistance 16, while the remaining arm contains measuring cell resistance 18. The reference and measuring cells are the analytical components of a chromatographic analyzer.

Chromatographic apparatus for measuring the difference between the thermal characteristics of gases is disclosed and claimed in co-pending application Serial No. 609,160, filed September 11, 1956, by S. B. Spracklen et al., and entitled "Vapor Fraction Analyzer," now Patent No. 3,041,869. As pointed out in that application, the measurement is proportional to the difference between the thermal characteristics (i.e., the combined thermal conductivity and heat capacity characteristics) of the carrier gas and that of the effluent binary mixtures.

The resistance of measuring cell resistance 18 varies in accordance with the thermal characteristics of the carrier fluid plus a particular fluid component as it is eluted from the chromatographic column. Resistance 16 measures the thermal characteristics of the carrier fluid alone. Thus, the bridge circuit becomes unbalanced and voltage appears between points 20 and 22 proportional to the unbalance and to the magnitude of the measured fluid component. The resultant voltage causes a current flow through one of component range adjustment potentiometers 26, through one of range selector switches 28, through one of component selector switches 30, and through recorder shunt resistance 24. The voltage drop across resistance 24 is measured and recorded as a percentage of the particular component being measured. It can thus be seen that by selecting a component range adjustment potentiometer of the proper resistance, the voltage drop across recorder shunt resistance 24, which voltage drop is transmitted to the recorder, controller, or the like, may be selected for the desired sensitivity of reading.

The manner in which the programming is set up and the proper potentiometer inserted for each component will be illustrated by further reference to the drawing. Master timer motor 32 controls both range selector switches 28 and stream solenoid switches 34.

As an example of the operation of the invention, assume that it is desired to analyze six gas streams for each of eight components. For simplicity of explanation, the concentration magnitudes of only three of the components is given in the following table:

| Component | Stream | | | | | |
| --- | --- | --- | --- | --- | --- | --- |
|  | 1 | 2 | 3 | 4 | 5 | 6 |
| A-----percent-- | 10 | 1 | 10 | 1 | 10 | 1 |
| B--------do---- | 20 | 5 | 20 | 1 | 5 | 20 |
| C--------do---- | 30 | 10 | 50 | 25 | 10 | 10 |

From the above table, it will be seen that, although each stream contains the same components, individual adjustment of measuring circuit resistance is required in order to achieve the desired instrument sensitivity. Assume, then, that potentiometers 262 and 264 are adjusted so as to give the desired sensitivity of measurement when component A is present in amounts of 10 percent and 1.0 percent respectively. Assume further that potentiometers 266, 268, and 260 are adjusted for component B in amounts of 20 percent, 5 percent and 1.0 percent respectively, and that the next four of range potentiometers 26 are adjusted respectively for 30 percent, 10 percent, 50 percent and 25 percent for the four concentration ranges in which component C is expected to occur. While only eight of the range potentiometers 26 are shown in the drawings, a total of nine will be required for a complete six stream-three recurring components per stream analysis of the above illustrative tabulation. Thus it will be recognized that the total number of range adjustment potentiometers required for any situation will be equal to the sum of the number of different concentration ranges in which each of the components of interest is present in the total number of streams to be analyzed. To illustrate, referring to the above tabulation; it can be seen that component A occurs in two different concentration ranges scil. 10 percent and 1 percent in the six streams; component B occurs in three different concentration ranges scil. 20 percent, 5 percent and 1 percent in the six streams and component C occurs in four different concentration ranges scil. 30 percent, 10 percent, 50 percent and 25 percent in the six streams. Adding the number of different concentration ranges in which each of the components of interest A, B, C is present in the six streams to be analyzed yields nine (2+3+4=9).

Selector switch 36 is turned to the "normal" position as indicated, energizing master timer motor 32. As motor 32 begins to rotate, it closes switch 38 which in turn energizes stream timer motor 40. The rotation of motor 40 closes switch interlock 42 so that motor 40 remains energized after switch 38 opens. Master timer motor 32 would rotate once for every six analyses in this particular illustration.

The rotation of motor 32 next closes stream solenoid switch 342 which energizes solenoid valve 44 to admit sample gas stream No. 1 to the analyzer sample metering system. Further rotation of motor 32 closes switches 282, 286, etc. simultaneously so that the proper resistances for measuring each component expected to occur in stream No. 1 are inserted into the measuring circuit. To start the analysis, motor 40 closes switch 46 which energizes sample injection valve 48, causing a metered volume of sample gas to be flushed into the chromatographic separation column by the inert carrier gas and thus begin the elution of the components to be measured.

At preselected times thereafter as the components A, B, C, etc. pass through the measuring cell containing resistance 18, motor 40 sequentially closes component selector switches 302, 304, etc. to measure the quantities of component A, B, C, etc. respectively until each component of sample 1 has been measured. Switch 42 then opens, stopping motor 40. Motor 32 which has rotated ⅙ of a cycle (in a six stream system) now opens switch 342 and switches 282, 286, etc. and closes switch 344 to admit sample stream No. 2; closes switches 284, 288, etc. simultaneously to insert the proper range potentiometers into the measuring circuit for sample stream No. 2; then closes switch 38 once again to restart motor 40 and repeat a similar analysis of the second stream. In other words, during the first sixth of a full six stream analysis cycle, those switches of range selector switches 28 which will close simultaneously are 282 (to connect the 10 percent A concentration range potentiometer in circuit), 286 (to connect the 20 percent B concentration range potentiometer in circuit) and one other to connect the 30 percent C concentration range potentiometer in circuit. During the second sixth of the cycle, the switches of range selector switches 28 which will close simultaneously are 284, 288 and one other to connect respectively the 1 percent A, 5 percent B and 10 percent C concentration range potentiometers into circuit. During the third sixth of the cycle, the switches of range selector switches 28 which will close simultaneously are 282, 286 and one other to connect respectively the 10 percent A, 20 percent B and 50 percent C concentration range potentiometers into circuit. Each of such range selection changes results in the connection of analyzer circuitry suitable for the particular A, B and C component concentrations expected to occur in the streams 1 through 6 sequentially analyzed. This is made clear by examination of the table hereinabove, where, in considering the component A, it is seen that in all six streams, A occurs in only two different concentration ranges, viz. 10 percent and 1 percent. This leads to the schematic wiring arrangement illustrated in the drawing where only two range selector switch means 282 and 284 are required to effect all the necessary range changes with respect to A's different predictable concentration ranges. Thus with range potentiometer 262 adjusted for 10 percent A concentration and 264 adjusted for 1 percent A concentration, switch means 282 will close for analyses of streams 1, 3, 5 and switch means 284 will close for analyses of streams 2, 4, 6. For the B component, one of switch means 286, 288 and 290 will be closed for any particular stream passing through the analyzer, these being connected respectively to the range adjustment potentiometers 266, 268, 260 which are adjusted respectively for the 20 percent, 5 percent and 1 percent concentration ranges in which B occurs in the six streams. It will be apparent that closure of any particular set of switching devices 282, 286, etc. can be as readily effected within say one eighth or one tenth of a full operating cycle for an eight stream or a ten stream arrangement as is illustrated with the one sixth of a full cycle for the six stream arrangement discussed.

Persons skilled in the art will comprehend several conventional ways to accomplish the necessary repeated closures of discrete switching means of the potentiometer range selector switches 28 during a single multi-stream analyzer cycle, using commercially available switching apparatus. In the embodiment of apparatus shown schematically in the drawing, the range selector switch 28 may be a model MC multi-cam recycling timer manufactured by the Industrial Timer Corporation of Newark, New Jersey, as described in that corporation's Bulletin No. 200.

One of the primary advantages of the present invention is that all wiring necessary to program a complex series of analyses may be done very simply between a few terminal boards as indicated in the drawing.

A further advantage derived from this invention is that, by simply stopping the rotation of the master timer motor 32 at the position in which the desired sample stream is flowing through the analyzer, that particular stream will be monitored constantly. This is easily accomplished by setting selector switch 36 on the "stream" position.

It is to be understood that applicant's invention is not to be construed as limited to the numbers of fluid streams, fluid components, and component magnitudes described above. The only limitations are those dictated by the practicability of the analysis, the available time, and similar considerations.

The particular measuring circuit described is a Wheatstone bridge but it is to be understood that the invention is equally applicable to use in adjusting the range of any measuring circuit, either A.C. or D.C. Similarly, any type of responsive means such as a controller or direct reading meter may be used in place of the recorder.

What is claimed is:

In circuit with a signal developing means and a signal indicating means of a multi-stream multi-component vapor fraction analyzer, an automatic range selecting analysis programmer comprising, in combination, a multiplicity of impedances each having an ohmic value to effect signal attenuation to a desired range on the signal indicating means, said multiplicity of impedances being equal in number to the sum of the number of different concentration ranges in which each of said individual components occur in a given number of streams to be analyzed; a multiplicity of first switching means selectably connectable each respectively to one of said multiplicity of impedances; first motive means operably connected to said first switching means and arranged to simultaneously close a first set of said multiplicity of first switching means, subsequently simultaneously open said first set and sequentially thereafter simultaneously close and subsequently simultaneously open subsequent sets of said multiplicity of first switching means, the number of said sets being equal to the number of different streams to be analyzed and the number of first switching means in each set being equal to the number of individual components to be analyzed; a multiplicity of second switching means numerically equal to the number of individual components to be analyzed arranged each in circuit with a different group of said multiplicity of first switching means, the number of first switching means in each group corresponding numerically to the number of different concentration ranges in which an individual component occurs in said given number of streams to be analyzed and the number of groups corresponding numerically to the number of individual components to be analyzed; second motive means operably connected to said second switching means and arranged to sequentially close and then open each of said multiplicity of second switching means and repeat such sequential opening and closing a number of times equal to the given number of streams to be analyzed.

References Cited in the file of this patent

UNITED STATES PATENTS

| | | |
|---|---|---|
| 2,753,713 | Mabey | July 10, 1956 |
| 2,813,010 | Hutchins | Nov. 12, 1957 |
| 2,826,908 | Skarstrom | Mar. 18, 1958 |

OTHER REFERENCES

Publication: Gas Chromatography, published in "Oil and Gas Journal," Dec. 17, 1956, pages 126–140. Copy in 73—23c.

Book: Gas Chromatography, edited by Coates Academic Press Inc., New York, reprinting Papers of the Symposium on Gas Chromatography of the ISA, August 1957, pages 275–278. Copy in Patent Office Library.